(12) United States Patent
Patterson, Jr.

(10) Patent No.: US 11,133,519 B2
(45) Date of Patent: Sep. 28, 2021

(54) FUEL CELL ASSEMBLY INCLUDING VARIED FLOW RESISTANCE

(71) Applicant: DOOSAN FUEL CELL AMERICA, INC., South Windsor, CT (US)

(72) Inventor: Timothy William Patterson, Jr., West Hartford, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 663 days.

(21) Appl. No.: 15/827,774

(22) Filed: Nov. 30, 2017

(65) Prior Publication Data

US 2019/0165401 A1 May 30, 2019

(51) Int. Cl.
| | | |
|---|---|---|
| *H01M 8/18* | (2006.01) | |
| *H01M 8/0258* | (2016.01) | |
| *H01M 8/0267* | (2016.01) | |
| *H01M 8/0265* | (2016.01) | |
| *H01M 8/026* | (2016.01) | |
| *H01M 8/2483* | (2016.01) | |
| *H01M 8/086* | (2016.01) | |

(52) U.S. Cl.
CPC ............. *H01M 8/18* (2013.01); *H01M 8/026* (2013.01); *H01M 8/0258* (2013.01); *H01M 8/0265* (2013.01); *H01M 8/0267* (2013.01); *H01M 8/2483* (2016.02); *H01M 8/086* (2013.01)

(58) Field of Classification Search
CPC .. H01M 8/0265; H01M 8/026; H01M 8/0258; H01M 8/2483; H01M 8/0267
See application file for complete search history.

(56) References Cited

U.S. PATENT DOCUMENTS

| | | | |
|---|---|---|---|
| 4,345,008 A | 8/1982 | Breault | |
| 4,463,067 A * | 7/1984 | Feigenbaum | H01M 2/38 429/451 |
| 5,230,966 A | 7/1993 | Voss et al. | |
| 5,344,722 A * | 9/1994 | Bjerrum | H01M 8/08 429/500 |
| 7,718,295 B2 | 5/2010 | Haltiner, Jr. et al. | |
| 2001/0021470 A1 | 9/2001 | May et al. | |
| 2005/0003257 A1 | 1/2005 | Willimowski et al. | |

(Continued)

FOREIGN PATENT DOCUMENTS

| | | | |
|---|---|---|---|
| JP | 05190186 A | * | 7/1993 |
| JP | H05190186 A | | 7/1993 |

(Continued)

OTHER PUBLICATIONS

JP05190186A Original and Translation from Espacenet (Year: 1993).*

(Continued)

*Primary Examiner* — Nathanael T Zemui
(74) *Attorney, Agent, or Firm* — Carlson, Gaskey & Olds

(57) ABSTRACT

An illustrative example fuel cell assembly includes at least one cooler and a plurality of fuel cells each having an anode and a cathode. Each of the anodes includes an anode flow plate configured to allow fuel to flow through the anode. The anode flow plates have a respective flow resistance that varies among at least some of the anodes based on a distance between the corresponding anode and the cooler.

20 Claims, 2 Drawing Sheets

(56) References Cited

U.S. PATENT DOCUMENTS

| | | | |
|---|---|---|---|
| 2005/0238943 A1* | 10/2005 | Akiyama | H01M 8/1067 |
| | | | 429/450 |
| 2007/0172709 A1 | 7/2007 | Nakakubo | |
| 2009/0025566 A1 | 1/2009 | Son et al. | |
| 2012/0028156 A1* | 2/2012 | Song | H01M 8/04768 |
| | | | 429/437 |
| 2014/0065508 A1 | 3/2014 | Darga et al. | |

FOREIGN PATENT DOCUMENTS

| | | | |
|---|---|---|---|
| JP | H06251790 A | 9/1994 | |
| JP | H09223505 A | 8/1997 | |
| JP | H10340733 A | 12/1998 | |
| JP | H1116589 A | 1/1999 | |
| JP | 2003157887 A | 5/2003 | |
| WO | 2008/019503 A1 | 2/2008 | |
| WO | 2008/079126 A1 | 7/2008 | |
| WO | 2013126075 A1 | 8/2013 | |

OTHER PUBLICATIONS

International Search Report and Written Opinion of the International Searching Authority for International application No. PCT/US2018/055386 dated Jan. 29, 2019.

International Search Report and Written Opinion of the International Searching Authority for International application No. PCT/US2018/055390 dated Jan. 29, 2019.

* cited by examiner

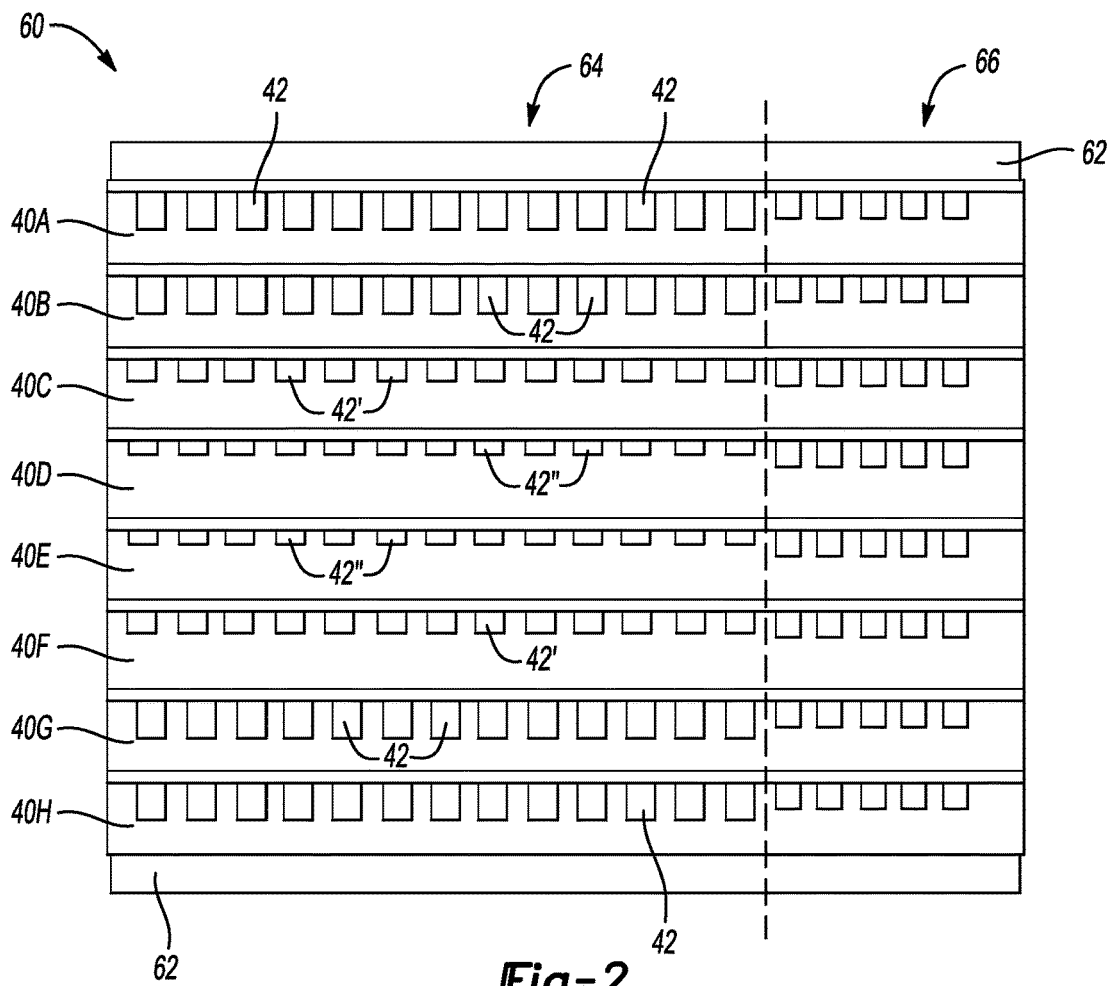
*Fig-2*
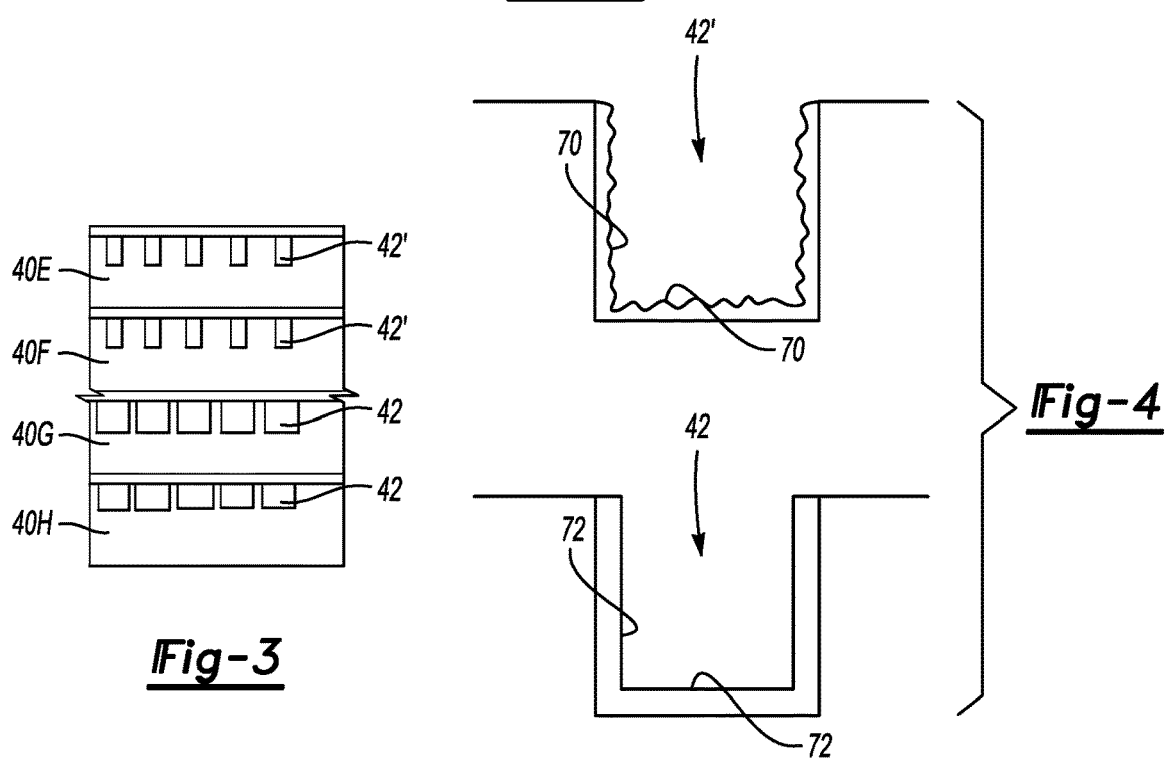
*Fig-3*
*Fig-4*

FUEL CELL ASSEMBLY INCLUDING VARIED FLOW RESISTANCE

BACKGROUND

Fuel cells produce electricity based on an electrochemical reaction. Efficient power production and useful fuel cell life depend, at least in part, on proper temperature management within a fuel cell assembly. One feature many fuel cell assemblies include for temperature management includes coolers that introduce a cooling fluid within the assembly.

One aspect of known cooler arrangements is that they tend to provide uneven cooling throughout a cell stack assembly. Cells that are closer to the cooler experience more cooling effect than cells that are spaced further away from a cooler. Differing temperatures among different cells within a cell stack assembly tend to have different effects on the performance or life of the various cells.

For example, in liquid electrolyte fuel cells, such as those that use phosphoric acid as an electrolyte, higher temperature cells tend to experience a higher acid loss rate compared to cells that tend to operate cooler. For example, the anode gas in portions of a colder cell contains less acid or liquid electrolyte than that in a hot cell. Often, the fuel is fed to the fuel cell using multiple passes with external manifolds to redistribute the flow from one pass to the next. When the gas from the hot cell and cold cell are mixed at an external manifold and redistributed to the anode flow plates liquid electrolyte tends to transfer from the hot cells to the cold cells. The acid loss rate of the hot cells tends to limit the life of such a cell. Further, there is a possibility for flooding the colder cells with liquid electrolyte.

Given the limited amount of space within a fuel cell assembly, it is not typically possible to increase the number of coolers throughout the assembly to provide more uniform cooling effect. It would be beneficial to have a lower acid loss rate and a more uniform distribution of electrolyte acid throughout a cell stack assembly to increase overall fuel cell efficiency and extend the useful life of the cell stack assembly.

SUMMARY

An illustrative example fuel cell assembly includes at least one cooler and a plurality of fuel cells each having an anode and a cathode. Each of the anodes includes an anode flow plate configured to allow fuel to flow through the anode. The anode flow plates have a respective flow resistance that varies among at least some of the anodes based on a distance between the corresponding anode and the cooler.

In an example embodiment having one or more features of the fuel cell assembly of the previous paragraph, the respective flow resistance of the anode flow plate affects flow of fuel through the corresponding anode, a first one of the anode flow plates has a first flow resistance, the first one of the anode flow plates is a first distance from the cooler, a second one of the anode flow plates has a second flow resistance, the second flow resistance is greater than the first flow resistance, the second one of the anode flow plates is a second distance from the cooler, and the second distance is different than the first distance.

In an example embodiment having one or more features of the fuel cell assembly of any of the previous paragraphs, the second distance is greater than the first distance.

In an example embodiment having one or more features of the fuel cell assembly of any of the previous paragraphs, the respective anodes include a zone where an electrochemical reaction occurs to generate electricity, the first flow resistance is in the zone of the first one of the anodes; and the second flow resistance is in the zone of the second one of the anodes.

In an example embodiment having one or more features of the fuel cell assembly of any of the previous paragraphs, the anode flow plates respectively include a plurality of flow channels and the first and second flow resistances are established by a configuration of the flow channels.

In an example embodiment having one or more features of the fuel cell assembly of any of the previous paragraphs, the anode flow plate of the first one of the anodes includes flow channels having a first flow dimension, respectively, the anode flow plate of the second one of the anodes includes flow channels having a second flow dimension, respectively, and the second flow dimension is smaller than the first flow dimension.

In an example embodiment having one or more features of the fuel cell assembly of any of the previous paragraphs, the first and second flow dimension each comprise at least one of a depth and a width of the corresponding flow channel.

In an example embodiment having one or more features of the fuel cell assembly of any of the previous paragraphs, the first and second flow dimension each comprise a cross-sectional area of the corresponding flow channels.

In an example embodiment including an electrolyte and having one or more features of the fuel cell assembly of any of the previous paragraphs, the different flow resistances of the respective at least some of the anodes causes a first amount of the electrolyte acid in a first one of the anodes to correspond to a second amount of the electrolyte acid in a second one of the anodes.

In an example embodiment having one or more features of the fuel cell assembly of any of the previous paragraphs, the first amount of the electrolyte is equal to the second amount of the electrolyte.

In an example embodiment having one or more features of the fuel cell assembly of any of the previous paragraphs, the flow resistance of a first one of the anode flow plates is less than the flow resistance of a second one of the anode flow plates, and the second one of the anode flow plates is further from the cooler than the first one of the anode flow plates.

In an example embodiment having one or more features of the fuel cell assembly of any of the previous paragraphs, the flow resistance of a third one of the anode flow plates is greater than the flow resistance of the second one of the anode flow plates and the third one of the anode flow plates is further from the cooler than the second one of the anode flow plates.

In an example embodiment having one or more features of the fuel cell assembly of any of the previous paragraphs, the respective anodes include a zone where an electrochemical reaction occurs to generate electricity and the flow resistance varies among the at least some of the anodes in the zone.

In an example embodiment having one or more features of the fuel cell assembly of any of the previous paragraphs, the anode flow plates respectively include a plurality of flow channels and the varied flow resistance is established by a varied configuration of the flow channels among the at least some of the anodes.

In an example embodiment having one or more features of the fuel cell assembly of any of the previous paragraphs, the anode flow plate of a first one of the anodes includes flow channels having a first flow dimension, respectively, the anode flow plate of a second one of the anodes includes flow channels having a second flow dimension, respectively, and the second flow dimension is different than the first flow dimension.

In an example embodiment having one or more features of the fuel cell assembly of any of the previous paragraphs, the first and second flow dimension each comprise at least one of a cross-sectional area, a depth and a width of the corresponding flow channel.

An illustrative example method of operating a fuel cell assembly having a plurality of anodes includes establishing a first fuel flow resistance through at least a portion of a first one of the anodes and establishing a second, different fuel flow resistance through at least a portion of a second one of the anodes based on difference in an expected operating temperature of the second anode and an expected operating temperature of the first anode.

In an example embodiment having one or more features of the method of the previous paragraph, the first one of the anodes has a first operating temperature, the second one of the anodes has a second operating temperature, the second operating temperature is greater than the first operating temperature, and the second fuel flow resistance is greater than the first fuel flow resistance.

An example embodiment having one or more features of the method of any of the previous paragraphs includes achieving a first electrolyte retention with the first one of the anodes and achieving a second electrolyte retention with the second one of the anodes, wherein the second electrolyte retention is essentially equal to the first electrolyte retention.

In an example embodiment having one or more features of the method of any of the previous paragraphs, establishing the first fuel flow resistance and establishing the second fuel flow resistance comprises establishing a configuration of at least some flow channels of an anode flow plate of a corresponding one of the anodes.

Various features and advantages of at least one disclosed embodiment will become apparent to those skilled in the art from the following detailed description. The drawings that accompany the detailed description can be briefly described as follows.

BRIEF DESCRIPTION OF THE DRAWINGS

FIG. 2 schematically illustrates selected portions of an example fuel cell stack assembly designed according to an embodiment of this invention.

FIG. 3 schematically illustrates another example configuration of a portion of a fuel cell assembly designed according to an embodiment of this invention.

FIG. 4 schematically illustrates selected features of another example embodiment.

DETAILED DESCRIPTION

Figure 1:
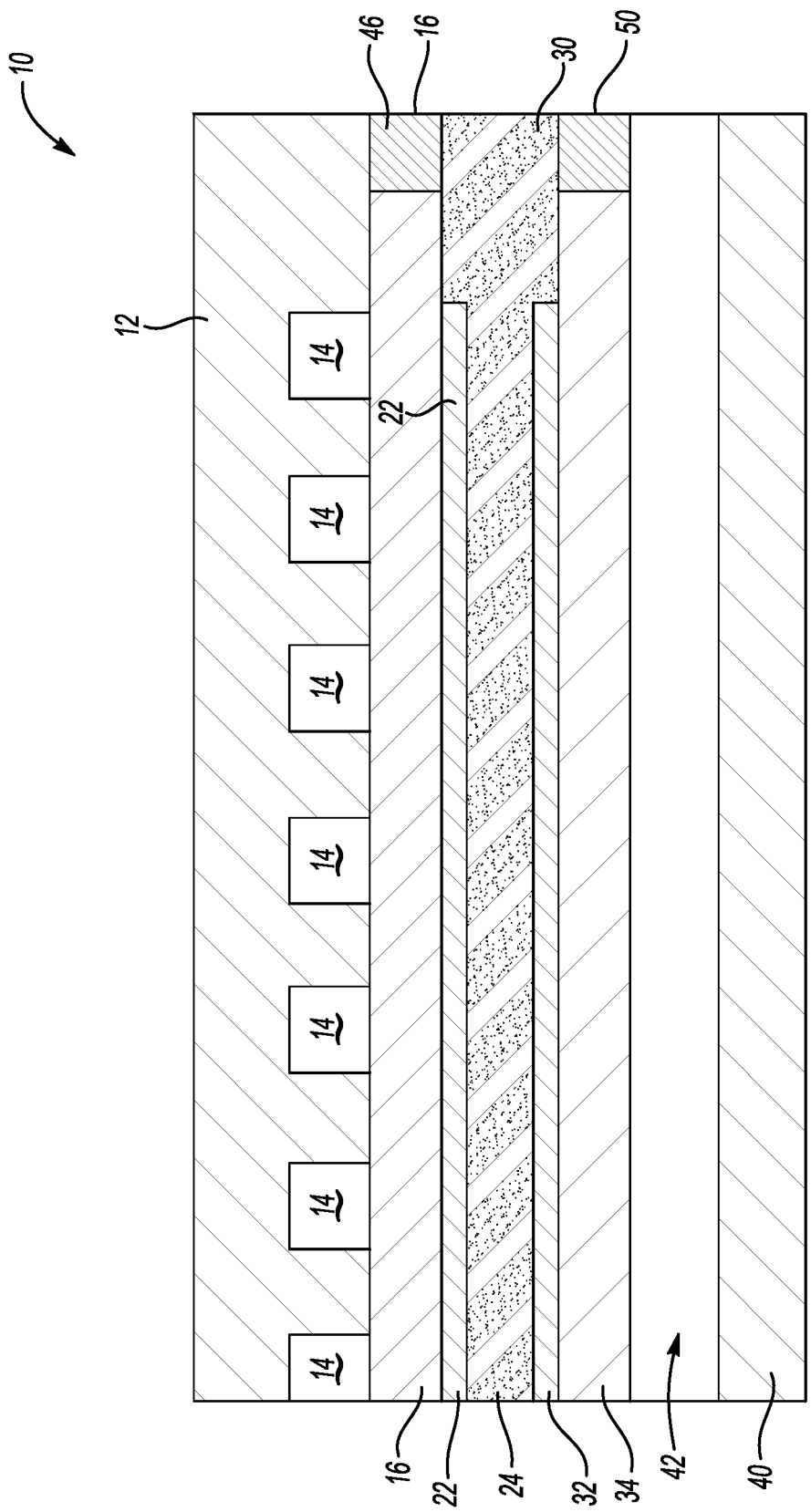
FIG. 1 schematically illustrates selected portions of an example fuel cell configuration designed according to an embodiment of this invention.

A liquid electrolyte fuel cell 10 is schematically represented in FIG. 1. Components of an individual cell are illustrated in FIG. 1. Those skilled in the art understand how a stack of such cells are assembled into a fuel cell stack assembly.

The fuel cell 10 includes a cathode including a cathode flow plate 12 that is configured for directing an oxidant reactant stream flow through the fuel cell 10 through a plurality of oxidant flow channels 14 that are established or defined within the cathode flow plate 12. A cathode substrate layer 16 is situated adjacent the cathode flow plate 12. A cathode catalyst layer 22 is situated adjacent the cathode substrate layer 16.

An electrolyte layer 24 is situated adjacent the cathode catalyst layer 22. The electrolyte layer 24 in this example is a liquid electrolyte retaining matrix. Liquid electrolyte is schematically represented at 30 in FIG. 1. In some embodiments, the liquid electrolyte comprises phosphoric acid.

An anode includes a catalyst layer 32 is situated adjacent the electrolyte layer 24 on an opposite side from the cathode catalyst layer 22. An anode substrate layer 34 is situated adjacent the anode catalyst layer 32. An anode flow plate 40 includes a plurality of fuel flow channels 42. The anode flow plate 40 is situated adjacent the anode substrate layer 34. The fuel flow channels 42 are configured for directing a flow of fluid reactant into pores of the anode substrate layer 34 so that fuel reaches the anode catalyst layer 32.

To prevent gaseous reactant streams from undesirably escaping the substrate layers, the cathode substrate layer 16 includes an edge seal 46 and the anode substrate layer 34 includes an edge seal 50. The edge seals 46 and 50 also prevent undesirable movement of a liquid electrolyte or liquid byproducts out of the perimeter of the fuel cell 10. Such edge seals are generally known.

FIG. 2 schematically illustrates selected portions of a fuel cell stack assembly 60. Coolers 62 are configured for directing a cooling fluid within the assembly 60 in a known manner for managing the temperature of the individual cells of the assembly. For simplicity of illustration, only the anode flow plates 40 of the individual cells are shown in FIG. 2. Those skilled in the art will realize that each individual cell includes the various components shown in FIG. 1.

The fuel cell assembly 60 includes an active zone or region 64 where the electrochemical reaction takes place for generating electricity. The illustrated example includes a condensation zone 66 that may be considered an inactive zone or section of each individual cell because the electrochemical reaction involving the fuel and air reactants does not occur in the zone 66.

In the illustrated arrangement, there are eight anode flow plates 40 between two coolers 62. The flow plates 40A, 40B, 40G and 40H are closer to the coolers 62 than the flow plates 40C, 40D, 40E and 40F. Given their respective proximity to the coolers 62, the different flow plates will experience different temperatures during fuel cell assembly operation. The expected operating temperature of each cell varies based on the distance of the cell from a cooler 62 with cells further from the coolers 62 typically experiencing higher operating temperatures. Varying the flow resistance based on the expected operating temperature or distance from a cooler according to an embodiment of this invention facilitates managing the presence of the electrolyte acid in the cells, respectively, to improve or enhance the useful lifetime of the cell stack assembly.

The anode flow plates 40 in the illustrated embodiment include different flow resistances within the active zone 64 depending on the proximity of the flow plate 40 to a cooler 62. A first one of the anode flow plates 40A has a first fuel flow resistance through the fuel flow channels 42 in at least the active zone 64. A second one of the anode flow plates 40C has a second flow resistance through the fuel flow channels 42' in the active zone 64. The second flow resistance is greater than the first flow resistance. In this example, a third one of the anode flow plates 40D has a third flow resistance that is greater than the second flow resistance.

Embodiments of this invention may have different numbers of different flow resistances with at least one of those resistances being different than another. Having different flow capacities through the fuel flow channels 42 of at least some of the respective anode flow plates 40 reduces or minimizes the acid loss rate in the cells that tend to be hotter. The greater flow resistance in the hotter cells, which are relatively further from the coolers 62, tends to increase acid retention in those cells compared to the cooler cells that are closer to the coolers 62 and that have a lower fuel flow resistance. The lower fuel flow resistance in the anode flow plates of the cooler cells and the greater flow resistance in the hotter cells tends to cause acid transfer from the cooler cells with lower flow resistance to the hotter cells. Such acid transfer over time has the effect of balancing out the acid among the cells. By effectively transferring acid from cooler cells to hotter cells through the different flow resistances, the amount of acid retention among the cells is essentially equal and all of the cells tend to have the same useful life. Otherwise, the hotter cells can tend to dry out faster than cooler cells, which reduces the performance, efficiency and lifetime of those hotter cells and, as a result, the entire cell stack assembly.

One way of achieving or providing the different fuel flow resistances includes having different flow dimensions in flow field channels in the respective anode flow plates 40. The illustrated example embodiment includes a first cross-sectional area of the flow channels 42 in the first one of the anode flow plates 40A. The flow channels 42' in the second one of the flow plates 40C have a second cross-sectional area. As can be appreciated from FIG. 2, the first cross-sectional area of the flow channels 42 is larger than the second cross-sectional area of the flow channels 42'. Having a smaller cross-sectional area increases the flow resistance or restricts the amount of fuel flow through the flow channels 42' compared to the flow channels 42.

In the example of FIG. 2, the different cross-sectional areas are realized by having a first depth of the flow channels 42 compared to a second, smaller depth of the flow channels 42'. The width of the respective flow channels 42 and 42' is approximately the same in the example of FIG. 2. A third depth of the respective flow channels 42" in the third anode flow plate 40D is smaller than the second depth resulting in a greater flow resistance in the third anode flow plate 40D compared to that of the second anode flow plate 40C.

FIG. 3 schematically illustrates another configuration in which the flow channels 42' of the hotter anode flow plates 40E and 40 F, for example, have a smaller width, which is a horizontal dimension in the drawing, compared to the width of the flow channels 42 of the relatively cooler anode flow plates 40G and 40 H.

The different flow dimensions among at least some of the anode flow plates 40, which may be at least one of the depth, width and cross-sectional area, establishes or provides a different flow resistance. Selectively placing anode flow plates 40 with different flow resistances relative to the coolers 62 allows for varying the flow resistance as a function of or based upon the distance from the coolers 62 or the expected operating temperatures of the corresponding cells.

FIG. 4 schematically illustrates a feature of another example embodiment. In this example, the flow channels 42' have a rougher or more varied surface texture schematically shown at 70 compared to a smoother or more uniform surface texture 72 within the flow channels 42. A more course or rougher texture within a flow channel tends to introduce more turbulence which tends to increase fuel flow resistance through such a channel.

Various flow channel configurations are shown in the different illustrations. Those configurations are not exclusive to those particular example embodiments. Combinations of selected ones of those features may be used for other ways of realizing different flow capacities through the flow channels situated in a condensation zone for different flow plates.

While there is some amount of progressive increase in flow resistance along the stack shown in FIG. 2, other embodiments have other patterns of different flow resistances among the anodes that have different flow resistances. The number of cells or flow plates that are considered warmer or cooler may vary and those skilled in the art will realize which cells fit into which category and how to vary the flow resistance among them depending on their particular fuel cell assembly configuration and cooler placement.

The different flow capacities reduces the acid or liquid electrolyte loss rate from the higher temperature cells and the potential for acid or liquid electrolyte flooding in the colder cells can also be reduced. Providing different flow capacities and permitting different flow rates through the flow channels of different ones of the anode flow plates 40 improves fuel cell performance and extends the useful life of a fuel cell assembly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell assembly, comprising:
a first cooler;
a second cooler; and
a plurality of fuel cells arranged in a stack situated between the first cooler and the second cooler, each of the fuel cells having an anode and a cathode, each of the anodes including an anode flow plate configured to allow fuel to flow through the anode, the anode flow plates having a respective flow resistance that varies among at least some of the anodes based on a distance between the corresponding anode and the first cooler or the second cooler, the anode flow plate of a first one of the anodes near one end of the stack and closer to the first cooler than others of the anodes having a first flow resistance, the anode flow plate of a second one of the anodes near a middle of the stack having a second flow resistance that is greater than the first flow resistance, the anode flow plate of a third one of the anode flow plates near an opposite end of the stack and closer to the second cooler than others of the anodes having a third flow resistance that is less than the second flow resistance.

2. The fuel cell assembly of claim 1, wherein
the respective flow resistance of each anode flow plate affects flow of fuel through the corresponding anode;
the flow of fuel has a corresponding liquid electrolyte loss rate; and
the liquid electrolyte loss rate is essentially equal in each of the first anode flow plate, the second anode flow plate and the third anode flow plate.

3. The fuel cell assembly of claim 1, wherein
the respective anodes include a zone where an electrochemical reaction occurs to generate electricity;

the first flow resistance is in the zone of the first one of the anodes;

the second flow resistance is in the zone of the second one of the anodes; and the third flow resistance is in the zone of the third one of the anodes.

4. The fuel cell assembly of claim 1, wherein the anode flow plates respectively include a plurality of flow channels; and the first, second and third flow resistances are established by a configuration of the flow channels.

5. The fuel cell assembly of claim 4, wherein the anode flow plate of the first one of the anodes includes flow channels having a first flow dimension, respectively;

the anode flow plate of the second one of the anodes includes flow channels having a second flow dimension, respectively; and the second flow dimension is smaller than the first flow dimension.

6. The fuel cell assembly of claim 5, wherein the first and second flow dimension each comprise at least one of a depth and a width of the corresponding flow channel.

7. The fuel cell assembly of claim 5, wherein the first and second flow dimension each comprise a cross-sectional area of the corresponding flow channels.

8. The fuel cell assembly of claim 1, comprising an electrolyte acid and wherein the different flow resistances of the respective at least some of the anodes causes a first amount of the electrolyte acid in the first one of the anodes to correspond to a second amount of the electrolyte acid in the second one of the anodes.

9. The fuel cell assembly of claim 8, wherein the first amount of the electrolyte acid is equal to the second amount of the electrolyte acid.

10. The fuel cell assembly of claim 1, wherein the first flow resistance is equal to the third flow resistance.

11. The fuel cell assembly of claim 10, wherein the flow resistance of the anode flow plate of a fourth one of the anodes is greater than the second flow resistance of the anode flow plate of the second one of the anodes; and the anode flow plate of the fourth one of the anodes is further from the first cooler than the second one of the anodes.

12. The fuel cell assembly of claim 1, wherein the anode flow plates respectively include a plurality of flow channels; and the varied flow resistance is established by a varied configuration of the flow channels among the at least some of the anodes.

13. The fuel cell assembly of claim 12, wherein the anode flow plate of the first one of the anodes includes flow channels having a first flow dimension, respectively;

the anode flow plate of the second one of the anodes includes flow channels having a second flow dimension, respectively; and the second flow dimension is smaller than the first flow dimension.

14. The fuel cell assembly of claim 13, wherein the first and second flow dimension each comprise at least one of a cross-sectional area, a depth and a width of the corresponding flow channel.

15. A method of operating a fuel cell assembly having a plurality of anodes, the method comprising:

establishing a first fuel flow resistance through at least a portion of a first one of the anodes; and establishing an equal liquid electrolyte loss rate of the first one of the anodes and a second one of the anodes by establishing a second, different fuel flow resistance through at least a portion of the second one of the anodes based on a difference in an expected operating temperature of the second one of the anodes and an expected operating temperature of the first one of the anodes.

16. The method of claim 15, wherein the first one of the anodes has a first operating temperature;

the second one of the anodes has a second operating temperature;

the second operating temperature is greater than the first operating temperature; and the second fuel flow resistance is greater than the first fuel flow resistance.

17. The method of claim 15, wherein establishing the first fuel flow resistance and establishing the second fuel flow resistance comprises establishing a configuration of at least some flow channels of an anode flow plate of a corresponding one of the anodes.

18. The method of claim 15, comprising establishing an equal liquid electrolyte loss rate of the second one of the anodes and a third one of the anodes by establishing a third, different fuel flow resistance through at least a portion of the third one of the anodes based on difference in an expected operating temperature of the third one of the anodes and the expected operating temperature of the second one of the anodes.

19. The method of claim 18, wherein the plurality of anodes are arranged in a stack;

a first cooler is situated near one end of the stack;

a second cooler is situated near an opposite end of the stack;

the first one of the anodes is closer to the first cooler than the second one of the anodes and the third one of the anodes;

the third one of the anodes is closer to the second cooler than the second one of the anodes and the first one of the anodes;

the second fuel flow resistance is greater than the first fuel flow resistance; and the second fuel flow resistance is greater than the third fuel flow resistance.

20. A fuel cell assembly, comprising:

a stack including a plurality of cells respectively including at least an electrolyte layer, an anode flow plate on one side of the electrolyte layer, and a cathode flow plate on an opposite side of the electrolyte layer; and a plurality of coolers, each of the coolers being situated at an end of the stack with a first one of the cells closer to the cooler than a second one of the cells;

wherein the anode flow plates respectively include a plurality of flow channels that establish a flow capacity of at least a portion of the anode flow plate, the second one of the cells is near a middle of the stack, the flow channels of the anode flow plate of each of the first ones of the cells establish a first flow capacity, the flow channels of the anode flow plate of the second one of the cells establish a second flow capacity, and the first flow capacity is greater than the second flow capacity.

\* \* \* \* \*